United States Patent [19]

Heinen et al.

[11] 4,208,378

[45] Jun. 17, 1980

[54] DESORPTION OF GOLD FROM ACTIVATED CARBON

[75] Inventors: Harold J. Heinen; David G. Peterson; Roald E. Lindstrom, all of Reno, Nebr.

[73] Assignee: The United States of America as represented by the Secretary of the Interior, Washington, D.C.

[21] Appl. No.: 786,739

[22] Filed: Apr. 11, 1977

Related U.S. Application Data

[63] Continuation-in-part of Ser. No. 660,942, Feb. 24, 1976, abandoned.

[51] Int. Cl.$^2$ ................................................ C01G 3/00
[52] U.S. Cl. ........................................... 423/27; 423/25
[58] Field of Search ................... 423/23, 27, 25, 24; 75/118; 210/30 R, 37 B, 40; 252/414

[56] References Cited

U.S. PATENT DOCUMENTS

| | | | |
|---|---|---|---|
| 3,920,403 | 11/1975 | Ross | 75/118 |
| 3,935,006 | 1/1976 | Fischer | 75/118 |
| 3,970,737 | 7/1976 | Davidson | 423/27 |

*Primary Examiner*—Brian E. Hearn
*Attorney, Agent, or Firm*—William S. Brown; Donald A. Gardiner

[57] ABSTRACT

Gold is desorbed from activated carbon by contacting, at a temperature of about 70° to 160° C., with a solution comprising about 20 to 30 percent by volume of a water soluble alcohol and about 80 to 70 percent by volume of an aqueous solution of a strong base.

5 Claims, 3 Drawing Figures

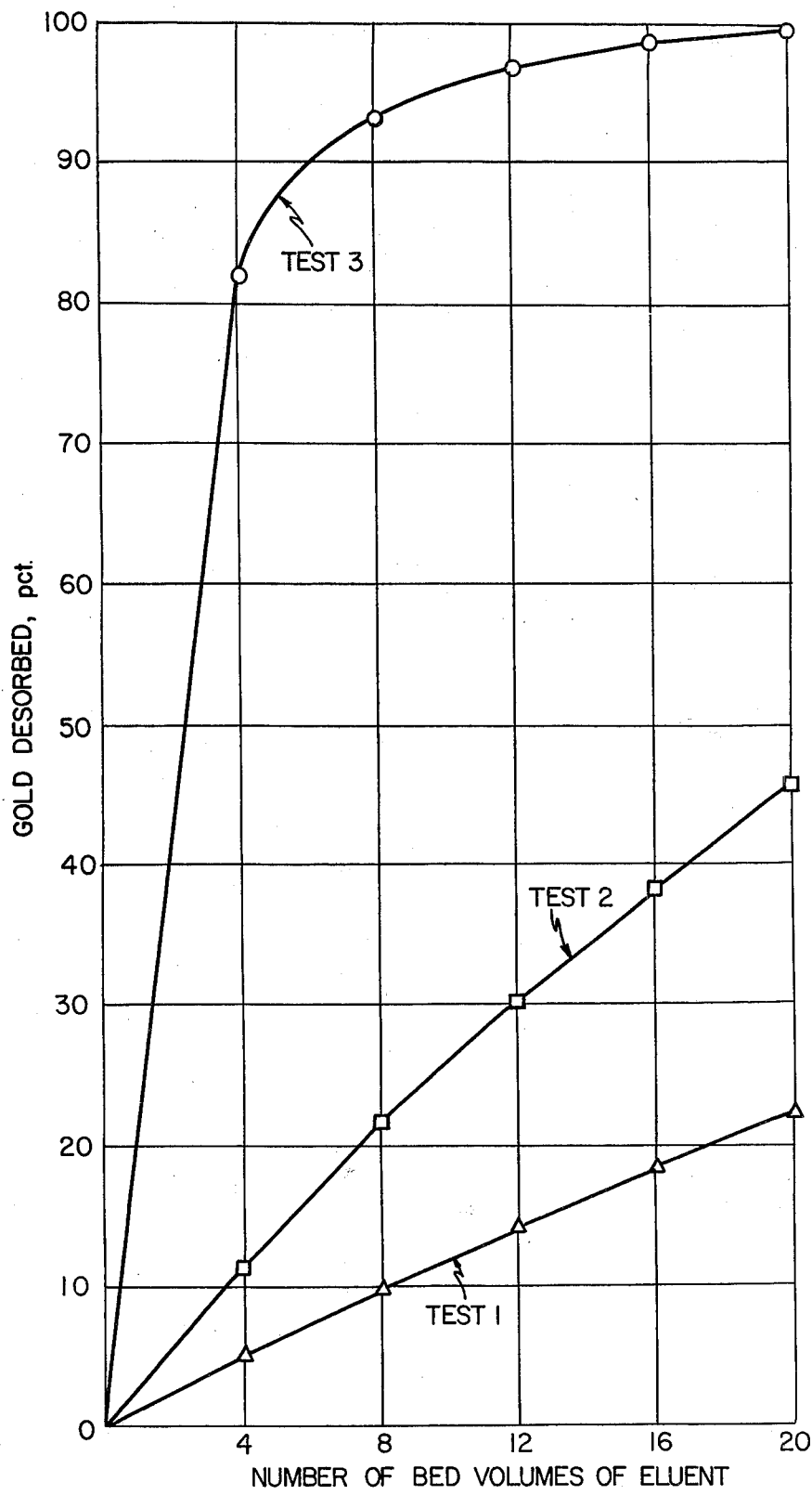

DESORPTION OF GOLD FROM ACTIVATED CARBON

This application is a continuation-in-part of application Ser. No. 660,942, filed Feb. 24, 1976 and now abandoned.

Cyanidation is commonly employed for extraction of gold from its ores. In this process, the crushed ore is dissolved in a dilute solution of sodium cyanide, or calcium cyanide, and a small amount of lime, in the presence of oxygen, the gold dissolving in the form of the complex $Au(CN)_2$. Recovery of the gold has conventionally been accomplished by treatment of the resulting cyanide solution with zinc dust. More recently, activated carbon has been found to be an efficient adsorbent of the gold cyanide complex, and a variety of processes based on this reaction have been developed. Effectiveness of these processes is, however, dependent on development of efficient means for desorbing the gold from the loaded carbon. Stripping with hot caustic sodium cyanide solution at atmospheric pressure to desorb the gold, followed by electrolysis to win the metal values, has been employed. However, this method has the disadvantage that simultaneous stripping and electrolysis is slow. Elevated pressure has also been employed, so that the temperature of the caustic cyanide solution can be raised to about 250° F. without boiling, thereby accelerating the desorption rate. This technique, however, requires the use of a boiler-pressure reactor, which makes the process more complicated.

A recent innovation, described in U.S. Pat. No. 3,935,006, issued Jan. 27, 1976, employs caustic-alcohol-water mixtures, containing over 75 percent alcohol by volume, at ambient temperature and pressure for desorbing gold from activated carbon. This method is very effective for desorption of gold from activated carbon loaded by treatment with synthetic $NaAu(CN)_2$ solutions. However, as illustrated in the examples below, it has not been found to be effective for desorption of gold from activated carbon loaded by treatment with cyanide plant effluents, particularly when the effluents contain the gold in the form of $CaAu(CN)_2$, i.e., when the effluent is formed by treatment of ores with calcium or sodium cyanide and lime. Investigations have shown that there is a significant difference in the behavior of sodium and calcium ions regarding carbon adsorption of gold, the aurocyanide complex being much more strongly adsorbed when calcium is employed as the cation. Since lime is generally employed to provide protective alkalinity in conventional cyanidation processes, an efficient process for desorption of the aurocyanide complex in the presence of calcium ion is essential for economical recovery of gold by means of activated carbon adsorption. In addition, soluble extraneous matter, such as organics, silicates, and ferrous-iron salts, in the pregnant cyanide effluents may play a significant role in the desorption process.

It has now been found, according to the process of the invention, that gold in the form of the aurocyanide complex, and particularly the calcium aurocyanide complex, is very efficiently desorbed from activated carbon by treatment of the loaded carbon with a stripping solution comprising about 20 to 30 percent by volume of a water soluble alcohol and about 80 to 70 percent by volume of an aqueous solution of a strong base at a temperature of about 70° to 160° C., preferably about 80° to 90° C.

BRIEF DESCRIPTION OF THE DRAWINGS

FIG. 3 is an illustration of percentage of gold desorbed vs. bed volumes of eluent.

Figure 1:
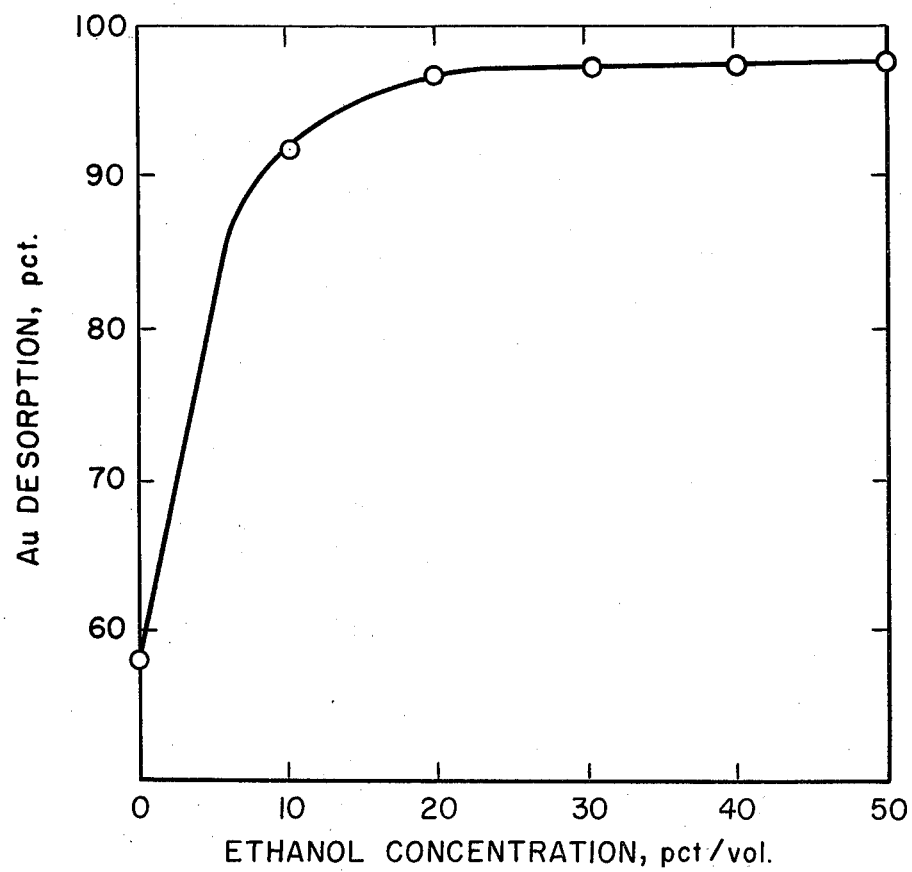
FIG. 1 is an illustration of percentage of gold desorption vs. ethanol concentration as in Example 1.

As illustrated in the examples below, the use of the elevated temperature results in a dramatic improvement in efficiency of desorption of the gold. An even more unexpected result, however, is that the desorption efficiency at the elevated temperature is substantially as good with the low alcohol concentration of the invention, i.e., 20 to 30 percent, as with the much higher alcohol concentration of the prior art, whereby the economy of the process is greatly improved. Recovery of the gold from the stripping solution is readily accomplished by conventional means such as electrolysis.

Activated carbon, suitable for use in the invention is a widely available material that is conventionally used in adsorption process, including gold adsorption. Typically, it will have a particle size of about 0.15 to 2 mm and a total surface area of about 600–900 $M^2/g$. It may be derived from any of a variety of sources such as coal, petroleum chars, coconut shell, or pulp mill black ash, and is activated by conventional means such as heating in a steam-air mixture at a temperature of about 850° C.

The activated carbon adsorbent is initially loaded by conventional means, i.e., by contacting a gold-cyanide solution e.g., a cyanide plant effluent, with the activated carbon for a time sufficient to permit adsorption of a major amount of the gold-cyanide complex. This may be accomplished by any conventional means for contacting liquids with solid adsorbents, e.g., by passing the gold-cyanide solution through a columnar unit containing a fixed bed of the activated carbon.

The gold is then desorbed from the loaded carbon, according to the process of the invention, by treatment with a solution comprising a water soluble alcohol and an aqueous solution of a strong base, at a temperature of about 70° to 160° C., preferably about 80° to 90° C. As discussed above, this temperature range has been found to be essential to achievement of efficient desorption of the gold, particularly where the gold-cyanide solution is a cyanide plant effluent formed by treatment of ores with calcium or sodium cyanide and lime.

The water soluble alcohol is preferably a lower aliphatic alcohol such as methanol, ethanol, propanol, or isopropanol. As mentioned above, the use of an elevated temperature permits the use of a relatively small proportion of alcohol, preferably about 20 to 30 percent by volume of the stripping solution.

The balance of the stripping solution consists essentially of a water solution of a strong base. Sodium hydroxide is the preferred base, but potassium hydroxide may also be used. The base is employed in an amount of about 1 to 2 percent by weight of the water solution, or an amount sufficient to provide the stripping solution with a pH of about 11 to 14, preferably about 13 to 14. Use of a high pH is essential since the activated carbon has a substantially decreased capacity for adsorption of the gold-cyanide complex at higher values of pH.

The stripping solution may also contain a small amount of sodium cyanide, e.g., about 0.02 to 0.1 percent by weight of the water solution, particularly where the stripping solution is recycled after removal of the desorbed gold. Such recycled solutions often contain small amounts of sodium cyanide as a contaminant from the stripping operation. Alternatively, the sodium cyanide may be added to the stripping solution and may result in somewhat increaseed efficiency in some cases. It is not, however, an essential ingredient of the stripping solution.

The stripping operation is carried out by contacting the loaded carbon with the stripping solution of the invention, at the required temperature. Again, contacting may be by any conventional means such as passing the stripping solution through a bed or column of the loaded carbon. Optimum amounts and flow rates of the stripping solution will depend on the amount of gold adsorbed on the loaded carbon, the composition of the gold-cyanide solution used for loading and specific composition and temperatures of the stripping solution and are best determined empirically. Generally, however, treatment of the loaded carbon with about 5 to 30 bed volumes of stripping solution, at a flow rate of about 2 to 8 bed volumes of solution per hour gives good results.

Although the processes of the invention has been found to be particularly effective for desorption of gold, it is also generally effective for desorption of silver, either alone or in combination with the gold.

The following examples will more specifically illustrate the practice of the invention and the advantages obtained thereby.

EXAMPLE 1

In this example, a series of desorption tests was conducted on loaded activated carbon from a heap leach-carbon adsorption cyanide plant in which leaching was accomplished by means of calcium cyanide solution containing sufficient lime to provide a pH in the range of 9–11. The loaded carbon carried 235 oz Au/ton and 35 oz Ag/ton.

Desorption was conducted in a vertical column 24 inches in length and 2 inches in diameter, containing an 18 inch deep bed of the loaded carbon. The stripping solution consisted of a water solution of 1 percent NaOH and 0.1 percent NaCN and varying proportions of ethanol. Nineteen bed volumes of the stripping solution were pumped upward through the carbon bed at the rate of 1 bed volume of solution per 15 minutes. Operating temperature was 80° C. Results are shown graphically in FIG. 1. It will be seen than an ethanol concentration as low as 20 percent gave near-maximum gold desorption. Results of such tests have in general shown a concentration of about 20 to 30 percent by volume of the alcohol to be optimum, with negligible increase in desorption with higher alcohol concentrations.

EXAMPLE 2

Figure 2:
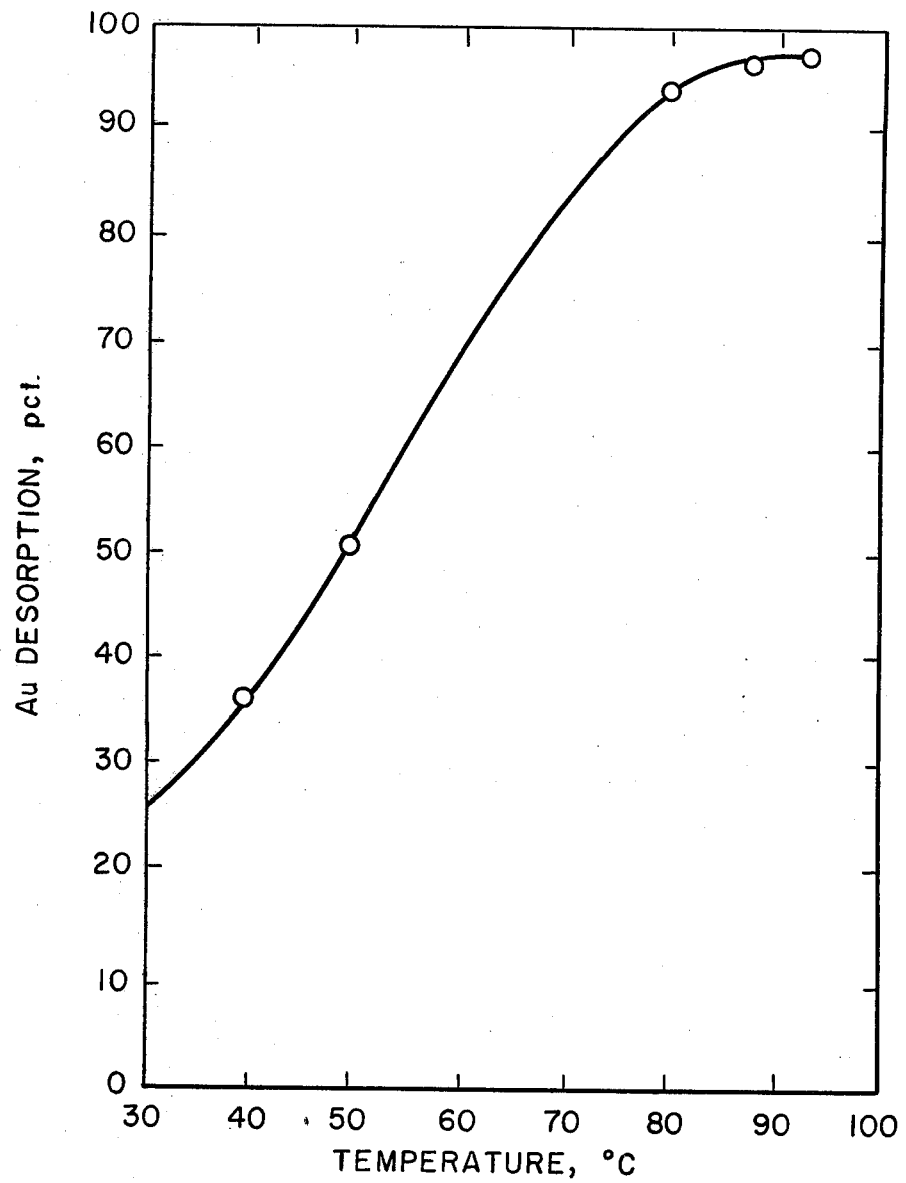
FIG. 2 is an illustration of percentage of gold desorption vs. temperature as in Example 2.

In this example, a series of desorption tests was conducted under conditions similar to those of Example 1, except that all strip solutions contained 20 volume percent of methanol as the alcohol component, and varying operating temperatures were employed. Results are shown graphically in FIG. 2. It will be seen that the gold desorption is highly temperature dependent and that a temperature of about 80° C. or above is essential for efficient desorption. Temperatures above about 90° C. have, however, generally been found to result in only minor additional improvement in desorption efficiency.

EXAMPLE 3

This example illustrates the improvement achieved by applicants' process as compared to that of the prior art. A series of three desorption tests was conducted on loaded carbon generated from a heap leach carbon adsorption cyanide plant which used lime for protective alkalinity during the cyanidation treatment. The loaded carbon assayed 362.9 oz Au/ton and 42.9 oz Ag/ton. Experimental conditions were similar to those of example 1, except that the operating temperature and compositions of the stripping solutions varied.

Tests 1 and 2, representative of the prior art, employed stripping solutions consisting of 5 percent water—95 percent ethanol and 10 percent water—90 percent methanol by volume, respectively, with each containing 1 g/l sodium hydroxide. Both tests were conducted at ambient temperature.

Test 3, representative of applicants' process, employed a stripping solution consisting of 80 percent water—20 percent ethanol by volume and containing 10 g/l sodium hydroxide. Operating temperature was 80° C.

Results are shown in FIG. 3 where percentage of gold desorbed is plotted against the number of bed volumes of eluent. It is apparent that the conditions of Test 3 provided greatly improved desorption as compared to that of Tests 1 and 2. In particular, desorption in Test 3 was greater than 99 percent with 20 bed volumes (5 hours) of eluent, with the stripped carbon assaying 3.1 oz Au/ton. By comparison, desorption in Tests 1 and 2 was only 22 and 45 percent, respectively, with 20 bed volumes of eluent.

We claim:

1. A process for desorption of gold from an activated carbon loaded by treatment with a leach solution containing calcium or sodium cyanide and lime comprising contacting the carbon with stripping solution consisting essentially of about 20 to 30 percent by volume of a water soluble alcohol and about 80 to 70 percent by volume of an aqueous solution of a strong base, the operating temperature being about 80° to 90° C.

2. The process of claim 1 in which the alcohol is methanol, ethanol, propanol, or isopropanol.

3. The process of claim 1 in which the aqueous solution of the strong base contains the base in an amount of about 1 to 2 percent by weight.

4. The process of claim 3 in which the strong base is sodium hydroxide or potassium hydroxide.

5. The process of claim 1 in which the alcohol is employed in an amount of about 20 percent by volume.

* * * * *